A. SOLES.
Improvement in Horseshoes.
No. 127,657. Patented June 4, 1872.
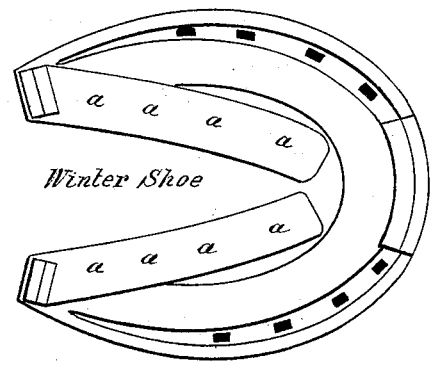
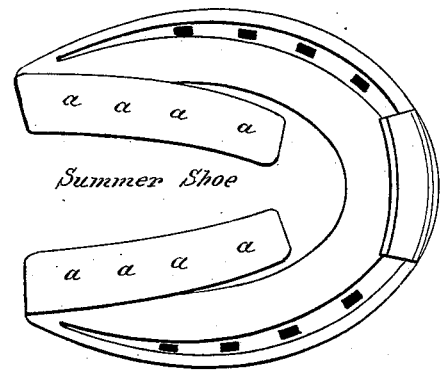
Witnesses
Thomas McNally
Charles P Wineger
Inventor
Abalm Soles

UNITED STATES PATENT OFFICE.

ABRAHAM SOLES, OF FONDA, NEW YORK, ASSIGNOR OF ONE-THIRD HIS RIGHT TO JAMES I. BROOKMAN, OF SAME PLACE.

IMPROVEMENT IN HORSESHOES.

Specification forming part of Letters Patent No. 127,657, dated June 4, 1872.

SPECIFICATION.

*To all whom it may concern:*

Be it known that I, ABRAHAM SOLES, of Fonda, in the county of Montgomery and the State of New York, have invented a new and Improved Mode of Constructing a Metal Spring-Guard for a Horseshoe; and I do hereby declare that the following is a full and exact description of the said invention—viz.:

The nature of my invention consists in providing two springs made of steel, of iron, or other suitable metal, drawn from or fastened, by welding or by means of a screw, to the heel-cork point of a common horseshoe, extending inward toward and within a short distance from the toe-point of the shoe, and near enough to that point, so that, when the shoe is upon the foot of the horse, the outer or toe-point ends of the springs will be near together, or, with respect to each other, form a V-like shape, and so positioned that, when the shoe is placed upon the foot of the horse, the springs will assume a position so as to allow the "frog" of the horse's foot to pass downward between the two springs, which springs and their relative positions and forms of construction are illustrated in the accompanying drawing by a a a a, which drawing is a part of this specification.

This mode of constructing spring-guards for horseshoes will entirely prevent small stone and other foreign substance from lodging and becoming fixed against the horse's foot between the inner rim or edge of the shoe and the frog of the foot, and will also prevent the accumulation of balls beneath the horse's foot in the winter season, and will prevent the bottom of the hoof from being injured by a sudden step upon a sharp stone or other material with which a horse's foot comes in contact in traveling.

What I claim as my invention, and desire to secure by Letters Patent, is—

The combination, with a horseshoe, of the two flat metallic springs, a a, each attached to the heel of the shoe at one end, and the other ends free and extended inward and near to the toe of the shoe, all as shown, and for the purposes set forth.

ABRAHAM SOLES.

Witnesses:
DANIEL YOST,
ADAM FONDA.